United States Patent
Brown et al.

(10) Patent No.: US 10,540,232 B2
(45) Date of Patent: Jan. 21, 2020

(54) RECOVERY USING PROGRAMMABLE LOGIC DEVICE

(71) Applicant: HEWLETT PACKARD ENTERPRISE DEVELOPMENT LP, Houston, TX (US)

(72) Inventors: Andy Brown, Houston, TX (US); James T Bodner, Houston, TX (US); David Blocker, Houston, TX (US); James A Blocker, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 198 days.

(21) Appl. No.: 15/708,741

(22) Filed: Sep. 19, 2017

(65) Prior Publication Data
US 2019/0087273 A1    Mar. 21, 2019

(51) Int. Cl.
G06F 11/00    (2006.01)
G06F 11/14    (2006.01)

(52) U.S. Cl.
CPC ...... G06F 11/142 (2013.01); *G06F 2201/805* (2013.01); *G06F 2201/82* (2013.01)

(58) Field of Classification Search
CPC .................................................. G06F 11/142
See application file for complete search history.

(56) References Cited

U.S. PATENT DOCUMENTS

| | | | |
|---|---|---|---|
| 7,043,664 B1 | 5/2006 | Chiloyan et al. | |
| 7,227,803 B2 | 6/2007 | Lee et al. | |
| 7,484,084 B1 * | 1/2009 | Ranaweera | G06F 8/656 713/1 |
| 7,594,144 B2 | 9/2009 | Brandyberry et al. | |
| 2004/0268116 A1 * | 12/2004 | Vasisht | G06F 11/1417 713/100 |
| 2005/0228888 A1 * | 10/2005 | Mihm | G06F 8/65 709/227 |
| 2006/0136703 A1 * | 6/2006 | Wisecup | G06F 9/4416 713/2 |
| 2007/0169088 A1 * | 7/2007 | Lambert | G06F 11/0709 717/168 |
| 2008/0235501 A1 | 9/2008 | Bailey et al. | |
| 2008/0256525 A1 * | 10/2008 | Ellsworth | G06F 8/60 717/168 |
| 2008/0256526 A1 * | 10/2008 | Ellsworth | G06F 11/1433 717/168 |
| 2012/0079260 A1 * | 3/2012 | Yin | G06F 11/1417 713/2 |

(Continued)

OTHER PUBLICATIONS

Carlos H.A. Costa et al., "A System Software Approach to Proactive Memory-error Avoidance," 2014, pp. 707-718, SC14: International Conference for High Performance Computing, Networking, Storage and Analysis, IEEE.

*Primary Examiner* — Joshua P Lottich
(74) *Attorney, Agent, or Firm* — Hewlett Packard Enterprise Patent Department (57) ABSTRACT

Examples disclosed herein relate to using a programmable logic device to perform a recovery operation on non-volatile storage devices. In response to receiving an indication to perform recovery, multiple storage devices are set to a predetermined value by the PLD. Recovery of the storage devices is to begin based on the predetermined value setting.

20 Claims, 3 Drawing Sheets

(56) References Cited

U.S. PATENT DOCUMENTS

| | | | |
|---|---|---|---|
| 2012/0110378 A1* | 5/2012 | Fan | G06F 11/1658 714/15 |
| 2012/0110379 A1* | 5/2012 | Shao | G06F 11/1417 714/15 |
| 2014/0317612 A1* | 10/2014 | Ayanam | G06F 11/1433 717/171 |
| 2015/0052381 A1* | 2/2015 | Zhang | G06F 11/3058 714/4.3 |
| 2015/0067084 A1* | 3/2015 | Yeh | G06F 11/2007 709/209 |
| 2015/0186150 A1* | 7/2015 | Chung | G06F 9/4408 711/103 |
| 2015/0355651 A1* | 12/2015 | Balakrishnan | G05B 15/02 700/299 |
| 2016/0328300 A1* | 11/2016 | Rahardjo | G06F 11/1417 |
| 2017/0052854 A1* | 2/2017 | Yang | G06F 11/1469 |
| 2017/0085383 A1* | 3/2017 | Rao | H04L 9/3234 |
| 2017/0357515 A1* | 12/2017 | Bower, III | G06F 9/4405 |
| 2018/0083854 A1* | 3/2018 | Munjal | H04L 67/18 |
| 2018/0088962 A1* | 3/2018 | Balakrishnan | G06F 9/4408 |
| 2019/0065786 A1* | 2/2019 | Young | G06F 21/74 |
| 2019/0073478 A1* | 3/2019 | Khessib | G06F 9/4401 |

* cited by examiner

RECOVERY USING PROGRAMMABLE LOGIC DEVICE

BACKGROUND

Information Technology companies and manufacturers are challenged to deliver quality and value to consumers, for example by providing computing devices with high availability or ensure that devices are rapidly brought back online when a failure occurs. A data center is a facility used to house computer networks, computer systems, and associated components, such as telecommunications and storage systems. Equipment in a data center may be in the form of servers mounted in rack cabinets. A data center may also include blade systems and/or cartridge systems that include servers mounted inside of an enclosure or chassis.

BRIEF DESCRIPTION OF THE DRAWINGS

The following detailed description references the drawings, wherein.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

DETAILED DESCRIPTION

Information Technology companies and manufacturers are challenged to deliver quality and value to consumers, for example by providing computing devices with high availability or ensure that devices are rapidly brought back online when a failure occurs. A data center is a facility used to house computer networks, computer systems, and associated components, such as telecommunications and storage systems. Equipment in a data center may be in the form of servers mounted in rack cabinets. A data center may also include blade systems and/or cartridge systems that include servers mounted inside of an enclosure or chassis.

When a computing device, such as a server, fails, firmware may be used to enable debugging and/or recovery. However, some times, firmware also misbehaves. One reason for firmware and/or software to misbehave is corrupted memory locations in non-volatile storage. Such a corruption can lead to an infinite loop, illegal operation, etc. that can prevent the computing system from behaving correctly. This can cause a race condition where one issue cannot be resolved because of a chain of issues that occur based on that issue.

In order to recover, non-volatile memories may be returned to "factory" conditions (e.g., erased, written to a particular value, etc.) in order to eliminate corruption issues and eliminate the incorrect behavior. Firmware operations may be used to erase or re-program non-volatile storage (e.g., Serial Peripheral Interface (SPI) parts, electrically eraseable programmable Read Only Memory (EEPROM), etc.). However, when a dependency exists (e.g., firmware is needed to operate in order to erase a SPI part and the SPI part is preventing the firmware from operating) additional challenges to recovery occur. Traditionally, corruption of this type can lead to non-functional systems and board replacement.

Accordingly, various examples described herein relate to using a hardware approach to erase multiple non-volatile component in the computing system in a manner that lets the non-volatile component to be recovered to a useable state. Hardware logic, such as a programmable logic device (PLD) such as a Complex Programmable Logic Device (CPLD) or Field Programmable Gate Array (FPGA) can be used to select and erase or set to a particular pattern the non-volatile storage.

A simple hardware approach is less likely to be corrupted because it can be programmed not to rely on corruptible values. For example, on some server devices, once a PLD is programmed in the factory, it is not reprogrammed. In other examples, the PLD may be reprogrammed in the field using another device (e.g., firmware).

The PLD can accept a signal to begin the recovery process. The signal can be a physical signal (e.g., a signal communicated based on a jumper setting, a switch, etc.) or a virtual signal (e.g., a signal coming from a connected port, firmware, etc.). In one example, in response to the signal, the PLD will set the computing system to a recovery state, for example, by performing a low-level, simple erase of multiple components that it is capable of erasing/programming. Firmware can be intelligently set such that firmware can recover from the recovery state as further described herein. Setting the firmware to a base state provides a reset scenario that can more easily be recovered from than one where corrupt values may still exist in the components.

The PLD can iterate through a list of devices and approaches for recovery. Different types of erasure/writing patterns can be used based on different types of components. In one example, for devices with an Inter-Integrated Circuit (I2C) bus, the PLD can implement a simple I2C master to create various write transactions to bytes writing a particular pattern (e.g., 0x00, 0xFF, etc.). In another example, for a serial peripheral interface (SPI) bus device, the PLD may select the whole device, select a chipselect, and perform a SPI ERASE part operation. In a further example approach, for particular SPI parts, a BULK_ERASE (0xC7) command may be used to erase the component.

Further, in some examples, for small amounts of data, the PLD may be able to program known good working default values to particular memory locations (e.g., after erasure of the component). Due to the simple nature of the PLD and usefulness of a hardware approach, much of the default values are known patterns or erasures instead of specific data.

Figure 1:
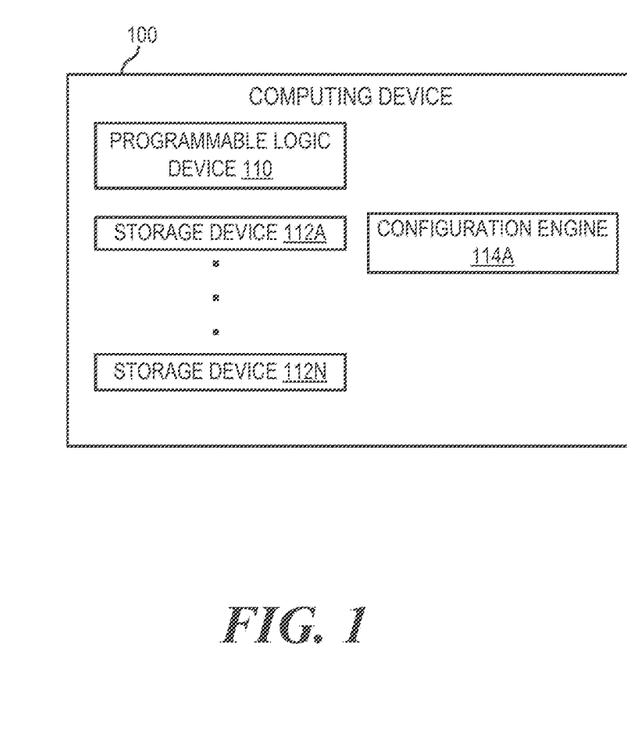
FIGS. 1 and 2 are block diagrams of computing devices with a programmable logic device capable of setting multiple storage devices to a pre-determined value, according to various examples.
Figure 2:
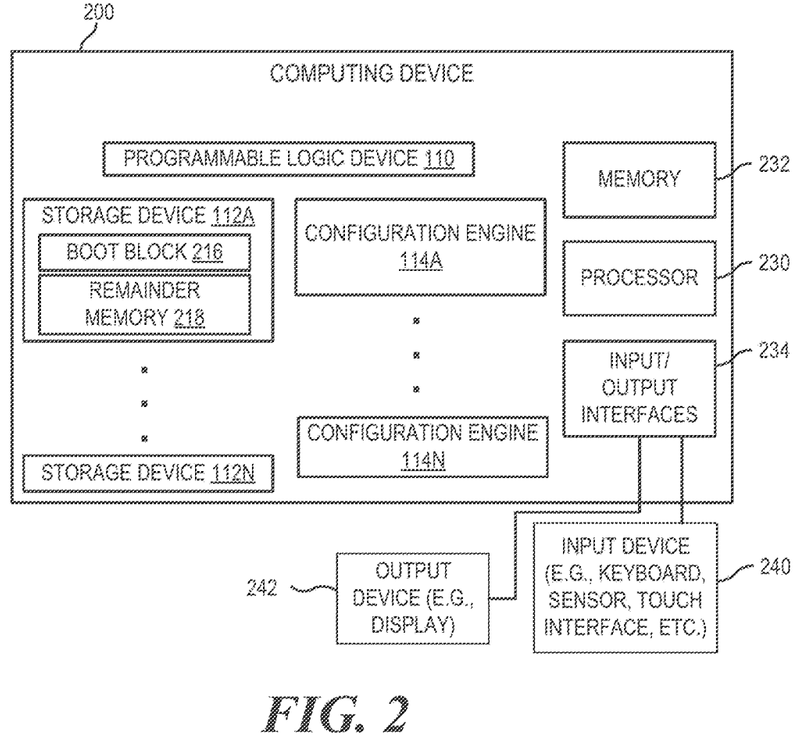

FIGS. 1 and 2 are block diagrams of computing devices with a programmable logic device capable of setting multiple storage devices to a pre-determined value, according to various examples. Computing devices 100, 200 include components that can be utilized to perform computer processing activities and include hardware that can be used to facilitate recovery from a condition caused by a corrupted memory location. The respective computing devices 100, 200 may be a desktop computer, a server, a workstation, or any other computing device that includes the capabilities described herein.

As shown in FIG. 1, computing device 100 can include a programmable logic device 110 as well as multiple storage devices 112A-112N and a configuration engine 114A. As shown in FIG. 2, computing device 200 can further include other configuration engines 114A-114N, a processor 230, memory 232, input/output interfaces 234, etc. Moreover, one or more of the storage devices 112, for example, storage device 112A can include a boot block 216 and a remainder memory 218 portion.

The PLD 110 can be capable to receive an indication to perform a recovery operation. As noted above, the indication can be based on a physical signal, such as a line pulled up or down to a logical 1 or 0 using a jumper, switch, or other approach. In another example, the indication can be based on a virtual signal (e.g., a digital signal received via a serial port, etc.). Upon receiving the signal, the PLD 110 can perform a number of tasks to set multiple storage devices 112 to a recovery state.

The storage devices 112A-112N hold information associated with the execution of the respective computing device 100, 200. At least some of the information is associated with a configuration engine 114A or multiple configuration engines 114A-114N. The storage devices 112A-112N can be non-volatile. As used herein, a storage device 112A-112N is considered non-volatile if its memory remains set after a power down and power up of the computing device 100. Thus, a battery backed SRAM would be considered non-volatile. Other examples of non-volatile memory include flash memory, EEPROM, etc.

In one example, a storage device 112A-112N is a device capable of holding configuration data, other information, or code that is usable by the configuration engine(s) 114 to facilitate usage of the computing device 100, 200. As noted, in some examples, at least some of the configuration data can be corruptible. Moreover, corrupted configuration data can cause the computing device to become inoperable. Because the configuration data is stored in non-volatile memory, a power down and bring up of the computing device 100 does not fix the issue. The storage device(s) 112A can be implemented as a dedicated storage device or as part of another integrated circuit, for example, a microcontroller. As used herein, a configuration engine 114A-114N is hardware and/or combinations of hardware and programming to perform functions to facilitate usage of the computing device 100, 200 by using one or multiple configuration setting stored on a storage device 112A-112N. Examples of configuration engines 114 include a baseboard management controller (BMC), an Input Output controller (I/O controller), a southbridge, super I/O, platform firmware controllers, software running on an executable environment of a booted operating system on a central processing unit of the computing device 200 that uses the configuration data, etc.

In response to the indication, the PLD 110 is to determine memory areas of multiple of the storage devices 112 to be set and set them. In one example, the setting is to 0 (or deleted). In another example, the setting is to 1. In a further example, the setting can be to a particular pattern. The particular pattern can be recognized by the computing device (e.g., via firmware) as being in a factor condition or recovery condition.

As part of setting the storage devices 112, the PLD 110 can determine a first memory area of the first storage device 112A to set to the pre-determined value. The determination can be based on a pre-programmed value. The PLD 110 can then set the first memory area to the pre-determined value. Similarly, the PLD 110 can determine and set a second memory area of a second storage device, a third memory area of a third storage device, etc. until setting of each of the storage devices pre-programmed to be set is complete.

As noted above, different types of erasure/writing patterns can be used based on different types of components. In one example, for 120 enabled devices, the PLD 110 can implement a simple 120 master to create various write transactions to bytes writing the particular pattern (e.g., 0x00, 0xFF, etc.). In this example, for a 256-byte part, a simple state machine could be implemented by the PLD 110 to repeatedly write the pattern to the storage device 256 times (or whatever the selected portion of memory that is to be erased).

In another example, for a SPI device, the PLD 110 may select the whole device, select a chipselect, and perform a SPI ERASE part operation. For example, an SPI transaction can be used to issue an 'ENABLE' command then then issue an "ERASE_ALL" command. In this case, the first memory area can be selection of the memory as a whole part. In a further example approach, for particular SPI parts, a BULK_ERASE (0xC7) command may be used to erase the component.

In one example, one of the storage devices 112 is a battery backed SRAM. In the example, the power can be interrupted to wipe memory for the part. In a similar example, the Vcc (power) signal to SRAM can be isolated to "erase" the SRAM. A write can be used to cause the Vcc to be isolated, which interrupts the power. If the 'power/battery' to the SRAM is isolated (using FETs/transistors), the SRAM will lose its contents. Upon re-application of power, the part will be in an indeterminate state. In some examples, firmware can detect this (e.g., using a checksum) and perform re-initialization. This can cause the SRAM to be "erased." In one example, if the storage device 112A accepts a discrete signal to erase the part, the discrete signal can be implemented to reset the entire device.

In some examples, it is possible to perform a reset of 'battery backed bits' in other devices (e.g., a bridge device, a controller hub, etc. that may include memory as well as other processing capabilities). Similar to the SRAM scenario, power can be isolated to those battery backed chips to cause certain bits in the chips to revert to a default state.

Thus, the PLD 110 can determine a memory area of a storage device based on pre-programmed values and set the memory area. In some examples, the PLD 110 writes the same pattern to all of the memory addressable by the PLD 110 to a particular storage device. Moreover, as noted, due to the nature of different types of storage devices 112, the PLD can set the memory area of a second one of the storage devices 112 to a different pattern.

Further, in some examples, for small amounts of data, the PLD 110 may be able to program known good working default values to particular memory locations (e.g., after erasure of the component). Due to the simple nature of the PLD 110 and usefulness of a hardware approach, much of the default values are known patterns or erasures instead of specific data. As noted, the predetermined value can be a factory default value for the respective storage device 112. Moreover, different storage devices may have different factory default values.

One or multiple of the configuration engines 114 can begin recovery of the storage devices 112. For example, a configuration engine 114A can read a particular memory location (e.g., a location of storage device 112A) that is in a first memory area of the storage device 112A and was set. Various approaches can be used to intelligently trigger the recovery. In one example, the location can be set to a particular value that gets checked for by the configuration engine 114A. For example, if the value is 0x00 or 0xFF, recovery is triggered. The value can be replaced by the configuration engine 114A with another value that does not trigger recovery.

In one example, the configuration engine 114A can have an associated storage device 112A that includes a boot block 216 and remainder memory 218. In this example, the boot block 216 is not part of the memory location that is written to or wiped. However, the remainder memory 218 is part of the memory area that is wiped for storage device 112A. In one example, the remainder memory 218 is all of the memory area of the storage device 112A that is not associated with the boot block 216.

As used herein, the boot block 216 includes code that, when executed by configuration engine 114A can check a memory location to determine whether to perform a recovery and perform the recovery operation based on the state of that memory location and if no recovery is to be performed, the configuration engine 114A will continue bringing the computing device 200 to its normal operational stage. This may be dependent on a subsystem that the configuration engine 114A is a part of. For example, if the configuration engine 114A is part of a BMC subsystem, the normal operational stage of the configuration engine 114A may be a standby state. In some examples, the boot block 216 does not include a loop in its programming. In other examples, the boot block 216 is not corruptible (e.g., is read only memory).

In one example, after the remainder memory 218 is wiped 218, a configuration engine 114a looks at a memory location in the remainder memory 218 and determines to perform the recovery operation based on the value of the memory location. For example, if the value is '0' (or another predetermined value to be looked for that the remainder memory 218 is set to), the recovery can be initiated. As noted above, the configuration engine 114a can re-initialize one or more of the storage devices 112 using the boot block.

Once recovery is complete, or during various steps of recovery, the configuration engine 114a can change the value of the memory location looked at to indicate the current step or that no recovery is in process. In some examples, a configuration engine 114a can retrieve firmware and/or configuration settings from a backup location and use that information to update one or more of the storage devices 112. In another example, the configuration engine 114a may retrieve the firmware and/or configuration settings from an external source. In another example, for some storage devices 112, the configuration engine 114a or another configuration engine 114 can change one or more settings to cause another one of the configuration engines 114 to read from a backup storage device. For example, firmware with a ROM and a backup ROM may be switched to use the backup ROM. During firmware updates, security features associated with the computing device 100, 200 can be implemented. In some examples, the boot block 216 may include the security process information.

As discussed above, corrupted memory locations can cause issues that lead the computing device 100, 200 to fail. For example, a loop that obtains a variable from a memory location. If that variable is corrupted to a high number, the loop could take an extended amount of time, which can cause the computing device 200 to hang. Example code can include obtaining the variable "COUNTER" from the memory location. For (i=0; i<COUNTER; i++) {do something}. The "do something" can take a particular amount of time (e.g., 1 second, 5 seconds, etc.). If COUNTER is expected to have a value between 1 and 9, but is corrupted to a large number, then the loop may take a long time to complete and essentially be hung, which can cause the computing device 200 to fail. As used herein, a counter variable is a variable used in a loop. The one or multiple counter variables can be stored in one or multiple storage devices 112.

In another example, if a memory location containing a code portion of the firmware is corrupted, a similar result may occur. For example, the code portion may include the following pseudo code:

```
machine instruction
machine instruction
compare
jump_if_equal to address_1
jump to other address_2
address_1
```

If the code portion is corrupt and the value of ADDRESS_1 in the jump_if_equal instruction is corrupt, it could point to itself rather than actual address_1. This would cause the instruction to repeat and may cause the system to hang. As used herein, a jump to address is a location referenced by a jump command in code. The jump to address and associated code can be stored in a storage device 112.

As noted above, hardware logic, such as a programmable logic device (PLD) such as a Complex Programmable Logic Device (CPLD) or Field Programmable Gate Array (FPGA) can be used to select and erase or set to a particular pattern the non-volatile storage. A CPLD is a programmable logic device that uses macrocells that include logic implementing disjunctive normal form expressions and more specialized logic operations. An FPGA is an integrated circuit that can be programmed using a hardware description language. FPGAs include an array of programmable logic blocks with a hierarchy of reconfigurable interconnects. In some examples, PLDs can include thousands of gates or more. In some examples, a CPLD can include non-volatile storage.

The configuration engines 114 include hardware and/or combinations of hardware and programming to perform functions provided herein. In one example, a configuration engine 114 can execute code retrieved from a storage device 112. In another example, a configuration engine 114 can reference memory stored in a storage device 112. In a further example, a configuration engine 114 may be a low level firmware device such as a BMC, an ASIC, a controller hub, etc. In another example, a configuration engine 114 may be implemented using a main processor of the computing device 200 as part of software executing on the processor (e.g., an operating system, middleware, etc.). An application programming interface (API) can be used to provide information from the storage devices to higher level configuration engines. For example, an Advanced Configuration and Power Interface (ACPI) can be used. As noted above, corruption in information received from the storage devices may cause the computing device 100, 200 to fail.

A processor 230, such as a central processing unit (CPU) or a microprocessor suitable for retrieval and execution of instructions and/or electronic circuits can be configured to perform functionality of the computing device 100, 200. In certain scenarios, instructions and/or other information can be included in memory 232 or other memory.

Input/output interfaces 234 may additionally be provided by the computing device 200. For example, input devices 240, such as a keyboard, a sensor, a touch interface, a mouse, a microphone, etc. can be utilized to receive input from an environment surrounding the computing device 200. Further, an output device 242, such as a display, can be utilized to present information to users. Examples of output devices include speakers, display devices, amplifiers, etc. Moreover, in certain examples, some components can be utilized to implement functionality of other components described herein. Input/output devices such as communication devices like network communication devices or wireless devices can also be considered devices capable of using the input/output interfaces 234.

As noted above, a configuration engine 114 may be implemented using a higher level operating system using a CPU or may be implemented at a lower level using other subsystems of the computing device 200. For example, one or more of the configuration engines 114 may be implemented using an ASIC such as a microcontroller used to control firmware of the computing device 200.

In one example, a configuration engine 114 can include a baseboard management controller (BMC). BMCs provide so-called "lights-out" functionality for computing devices. The lights out functionality may allow a user, such as a systems administrator to perform management operations on the computing device even if an operating system is not installed or not functional on the computing device. Moreover, in one example, the BMC can run on auxiliary power, thus the computing device need not be powered on to an on state where control of the computing device is handed over to an operating system after boot. As examples, the BMC may so-called provide management and so-called "out-of-band" services, such as remote console access, remote reboot and power management functionality, monitoring health of the system, access to system logs, and the like. As used herein, a BMC has management capabilities for subsystems of a computing device, and is separate from a processor that executes a main operating system of a computing device (e.g., a server or set of servers).

As noted, in some instances, the BMC may enable lights-out management of the computing device, which provides remote management access (e.g., system console access) to the computing device regardless of whether the computing device is powered on, whether a primary network subsystem hardware is functioning, or whether an OS is operating or even installed. The BMC may comprise an interface, such as a network interface, and/or serial interface that an administrator can use to remotely communicate with the BMC. In some examples, a BMC may be included as part of an enclosure. In other examples, a BMC may be included in one or more of the servers (e.g., as part of the management subsystem of the server) or connected via an interface (e.g., a peripheral interface). In some examples, sensors associated with the BMC can measure internal physical variables such as humidity, temperature, power supply voltage, communications parameters, fan speeds, operating system functions, or the like. The BMC may also be capable to reboot or power cycle the device.

In another example, a configuration engine 114 may include a controller hub such as an I/O controller hub. One example of an I/O controller hub is a southbridge. The controller hub may be used to manage data communications between a CPU and other components of a system board. In some examples, a controller hub may have direct media interface to a northbridge device or the CPU. Further the controller hub may provide peripheral support for the computing device 200, such as bus connections like Universal Serial Bus (USB), Peripheral Component Interconnect (PCI), PCI express, PCI extended, serial AT attachment, audio circuitry, integrated Ethernet, enhanced host controller interfaces, combinations thereof, etc.

In a further example, the configuration engine 114 may include platform firmware. Platform firmware may include an interface such as a basic input/output system (BIOS) or unified extensible firmware interface (UEFI) to allow it to be interfaced with. The platform firmware can be located at an address space where the CPU for the computing device 200 boots. In the scenario that there is a backup of the platform firmware on the computing device 200, another firmware device (e.g., a BMC) may be configured to remap the starting address space from the platform firmware to the backup platform firmware (e.g., using a switch, multiplexer/demultiplexer combinations, etc.). In some examples, the platform firmware may be responsible for a power on self-test for the computing device 200. In other examples, the platform firmware can be responsible for the boot process and what, if any operating system to load onto the computing device 200. Further, the platform firmware may be capable to initialize various components of the computing device 200 such as peripherals, memory controller settings, storage controller settings, bus speeds, video card information, etc.

In some examples, one or more of the configuration engines 114 can be implemented using a processing element and code stored on a machine-readable storage medium. A processing element may be, one or multiple central processing unit (CPU), one or multiple semiconductor-based microprocessor, one or multiple graphics processing unit (GPU), other hardware devices suitable for retrieval and execution of instructions stored in the machine-readable storage medium, or combinations thereof. The processing element can be a physical device. Moreover, in one example, the processing element may include multiple cores on a chip, include multiple cores across multiple chips, multiple cores across multiple, combinations thereof, etc. The processing element may fetch, decode, and execute instructions to enable functionality of the computing device 100, 200. As an alternative or in addition to retrieving and executing instructions, processing element may include at least one integrated circuit (IC), other control logic, other electronic circuits, or combinations thereof that include a number of electronic components for performing the functionality of the instructions.

A machine-readable storage medium may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), flash devices, and the like. As such, the machine-readable storage medium can be non-transitory.

Figure 3:
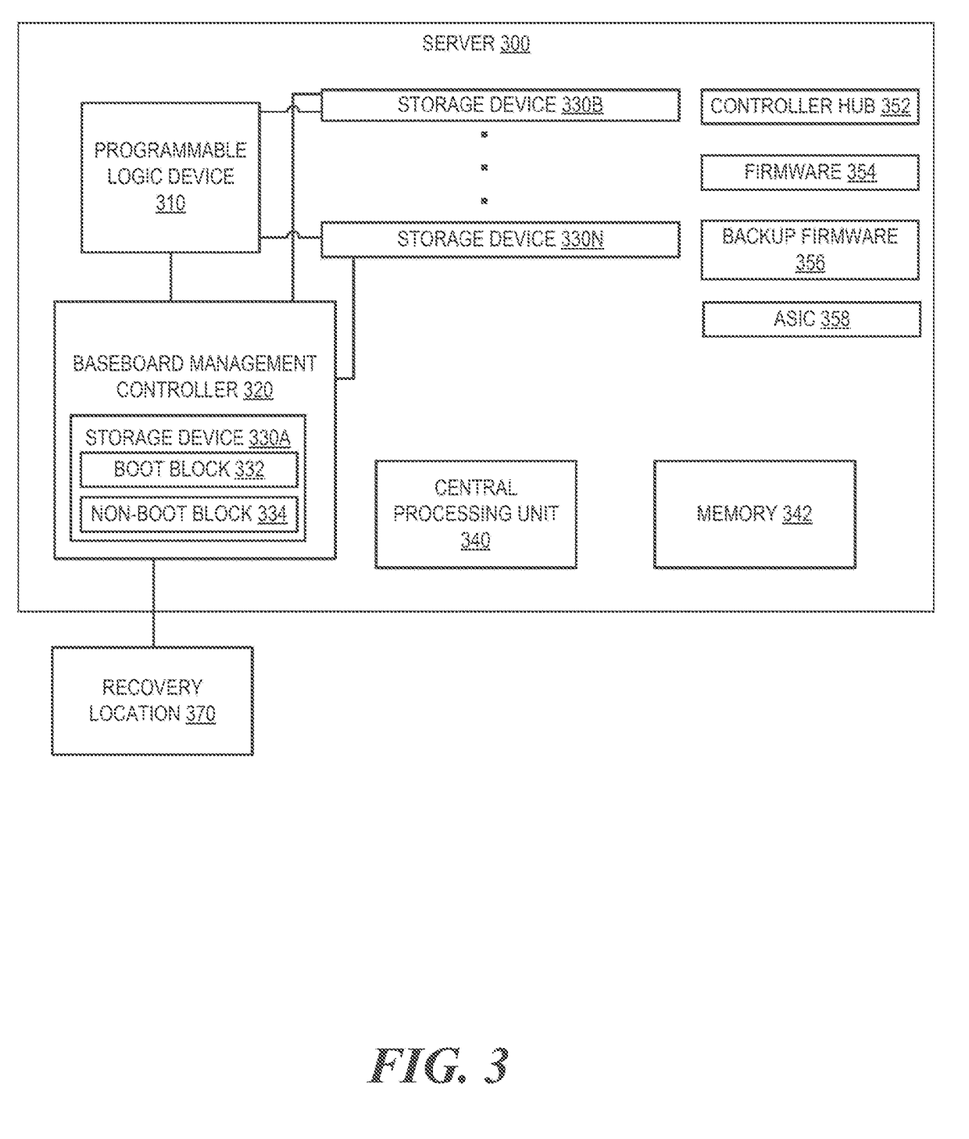
FIG. 3 is a block diagram of a server with a programmable logic device capable of setting multiple storage devices to a recovery condition, according to an example.

FIG. 3 is a block diagram of a server with a programmable logic device capable of setting multiple storage devices to a recovery condition, according to an example. Server 300 includes components that can be utilized to perform computer processing activities and include hardware that can be used to facilitate recovery from a condition caused by a corrupted memory location. Server 300 may be rack server, a workstation, a blade server, a tower server, a cartridge based server, or any other computing device that includes the capabilities described herein.

The server 300 can include a PLD 310, a BMC 320, a storage devices 330A, 330B-330N, CPU(s) 340, and memory 342. Further, in some examples, the server 300 can include a controller hub 352, firmware 354 that is executable, backup firmware 356, an ASIC or multiple ASICs 358. Moreover, in some examples, one or more of the storage devices 330 may include a boot block 332 and non-boot block. In some examples, the memory 342 can be memory that is directly addressable by the CPU(s) 340. The storage devices 330 can be non-volatile devices.

The PLD 310 can receive an indication to perform a recovery operations. As noted above, according to various examples, the PLD 310 can include a FPGA or CPLD. In one example, the indication is a signal (e.g., a single line connected to a switch, a jumper configuration, etc.) that allows the PLD 310 to trigger recovery based on a binary value (e.g., the value pulled up to a 1 or down to a 0). In other examples, a discrete signal could be used or a virtual signal. For example, a controller (e.g., a controller connected to an enclosure associated with the server 300, a controller connected via a serial port, etc.) connected to the PLD 310 can cause the recovery operation to be triggered.

In response to receiving the indication, the PLD 310 can perform a number of action to initiate recovery of the server 300. For example, PLD 310 sets each of the storage devices 330 to a recovery condition. The setting can include wiping at least one memory area of each of the storage devices 330. The storage devices 330 affected by the recovery may not be all of the storage devices used in the server 300. In other examples, storage devices related to particular configuration engines (e.g., engines associated with the controller hub 352, firmware 354, ASICs 358, etc.) can be part of the storage devices affected by the recovery. As noted above, various approaches can be used to wipe memory locations of the storage devices 330. In some examples, for example, in the case of platform firmware stored in a ROM, the storage device 330 includes information used by the CPU 340. In other examples, a storage device 330 may be read by a microcontroller. In further examples, the storage device 330 may be included as part of non-volatile memory of a controller.

In the case of the BMC 320, storage device 330A may be included as part of a microcontroller associated with the BMC 320 or be external to the BMC 320, but read via a bus. In one example, wiping of the memory location of storage device 330A includes wiping the non-boot block 334. In some examples, the boot block 332 includes information to boot the processing device and to repair the processing device (in this case the BMC 320). As part of executing the boot block 332, the BMC 320 can determine that the device is in a recovery mode. This can be based on a reading of a memory location of the non-boot block 334 that is now wiped. In response to a determination that the memory location reading indicates that a recovery operation should be performed, the BMC 320 can perform operations to repair the storage device 330A and return it to a functioning condition (e.g., a factory default).

In one example, the BMC can download firmware and/or settings to include in the storage device 330A from a recovery location 370. In one example, the recovery location 370 can be internal to the server 300. In another example, the recovery location 370 can be external to the server 300, but connected via a bus to a known location (e.g., an enclosure). In a further example, the recovery location 370 can be downloaded from an external location that the BMC 320 can connect to (e.g., via an Ethernet port enabled by the boot block 332 from a predetermined IP address). At various times during the recovery process, the BMC 320 or other configuration engine can set the memory location that indicates that a recovery operation should be performed to indicate that the recovery operation is not needed or another step of a recovery process should be performed next.

Moreover, as part of the recovery process, the BMC 320 can cause download and recovery of a second one of the storage devices 330 associated with an ASIC 358 separate from the BMC 320. In some examples, backup firmware and/or configurations for one or more of the storage devices can be stored at the recovery location 370. This backup information can be used for recovery. Also, in some examples, the recovery location 370 can be implemented using a flash or other non-volatile memory that is connected to the BMC 320 via a bus.

In one example, the memory area of the second storage device 330B that is wiped is all of the memory addressable by the PLD 310 to the storage device 330B. In another example, the PLD 310 writes a repeated pattern to the memory area. In a further example, the memory area is contiguous. The PLD 310 may be hard coded to write to the memory area using a loop when it receives the indication to perform the recovery operation. In some examples, the memory area of the second storage device can include each of a number of counter variables that are used in loops by logic (e.g., ASIC 358) that is separate from the BMC 320.

As described above, in some examples, the firmware 354 can be located at an address that the CPU 340 boots from. In one example, during the recovery process, the BMC 320 can move the location that is addressed from the firmware 354 to the backup firmware 356. Also, in this example, the backup firmware 356 is stored in a storage device that is not wiped, but the firmware 354 is stored in a storage device that is wiped. In other examples, the BMC can load replacement firmware for the firmware 354 from the recovery location 370. Though the BMC is described at downloading recovery information to respective storage devices, it is anticipated that other devices can be capable to repair their own storage devices and/or other locations.

As described above, various approaches can be used to wipe different storage devices 330. Further, in one example, a reset signal can be used to wipe non-volatile memory in the controller hub 352. Moreover, the storage devices can be separate from processing devices or can be a part of a processing device. As noted above, one or more of the storage devices 330 may include configuration information that is used by a high level software executing on one or more CPU 340, for example, by an operating system, middleware firmware, one or more drivers (e.g., storage drivers, I/O drivers, etc.), or the like.

Figure 4:
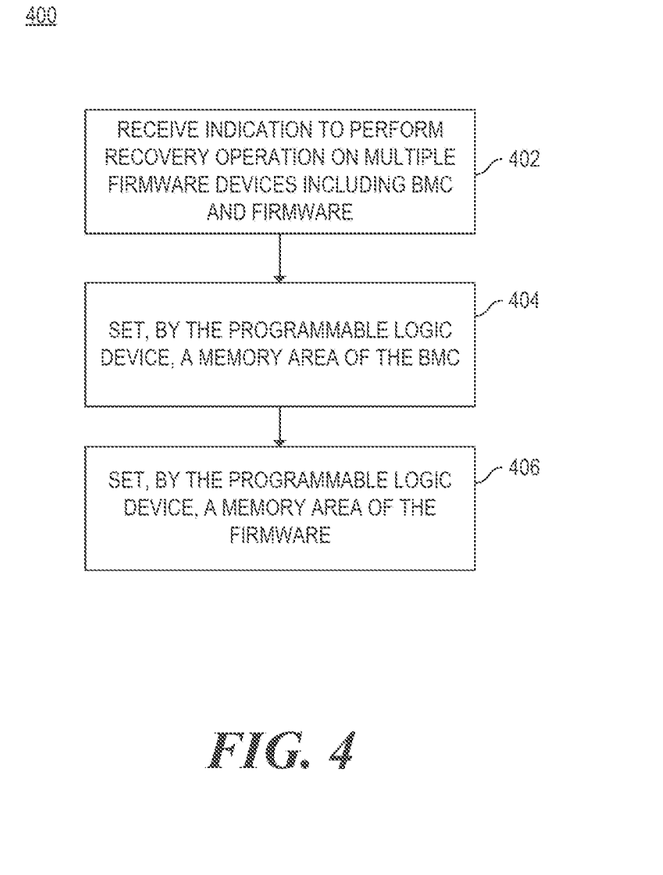
FIG. 4 is a flowchart of a method for setting, by a programmable logic device, memory areas associated with a baseboard management controller and another firmware, according to an example.

FIG. 4 is a flowchart of a method for setting, by a programmable logic device, memory areas associated with a baseboard management controller and another firmware, according to an example. Although execution of method 400 is described below with reference to server 300, other suitable components for execution of method 400 can be utilized (e.g., computing device 100, 200). Additionally, the components for executing the method 400 may be spread among multiple devices. Method 400 may be implemented in the form of executable instructions stored on a machine-readable storage medium and/or in the form of electronic circuitry.

At 402, the PLD 310 receives an indication to perform a recovery operation on a number of corruptible non-volatile storage devices, such as storage devices 330. The storage devices 330 can include storage device 330A associated with a BMC 320. In some examples, a second storage device 330B can be associated with low-level firmware (e.g., ASIC 358, firmware 354, etc.).

In response to the indication, at 404, the PLD 310 sets a first memory area (e.g., non-boot block 334) of storage device 330A to a predetermined value (e.g., 0, 1, a repeated pattern, etc.). As discussed above, the first memory area can include one or more counter variables for the BMC 320 and a portion of code for the BMC 320. Some of these values can be corruptible. As noted above, setting memory areas can include writing a same pattern to the memory area. As such, at 406, the PLD 310 can set a second memory area of another storage device 330B as well as other storage devices (e.g., storage devices 330B-330N). These can be set to predetermined values. Values can be different for different devices.

As noted above, the BMC 320 can use the boot block 332 to repair a portion of the code of the BMC 320 by downloading firmware from recovery location 370 when a pattern is written to a particular address of non-boot block 334. As part of executing the boot block 332, the BMC 320 can determine that the device is in a recovery mode from the value of the particular address. In response to a determination that the memory location reading indicates that a recovery operation should be performed, the BMC 320 can perform operations to repair the storage device 330A and return it to a functioning condition (e.g., a factory default).

In one example, the BMC 320, during the repair process, can repair code associated with firmware 354 to be executed by the central processing unit 340 by setting a backup storage device including backup firmware 356 to be used by the CPU 340.

As described herein, intelligent programming can be used to recover from wiped low level storage devices. The PLD 310 can be coordinated to wipe areas of the storage devices 330 that may be corruptible and leave certain portions unwiped in a manner that the storage devices can be recovered. In some examples, a coordinated boot procedure for firmware devices or configuration engines can be implemented to repair parts of firmware that are wiped.

In some examples, the computing devices and/or server can communicate via other devices via a communication network. A communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s).

By way of example, the computing devices such as servers may communicate with each other and other components with access to a communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A computing device comprising:
   at least one central processing unit and main memory;
   a programmable logic device to receive an indication to perform a recovery operation;
   a plurality of storage devices that hold information associated with execution of the computing device, wherein at least some of the information is associated with a configuration engine, wherein the storage devices are non-volatile;
   in response to receiving the indication, the programmable logic device to:
      determine a first memory area of a first storage device of the storage devices to set to a first predetermined value;
      set the first memory area to the first predetermined value;
      determine a second memory area of a second storage device of the storage devices to set to a second predetermined value; and
      set the second memory area to the second predetermined value;
   wherein a the configuration engine is to begin recovery of the first storage device based on the setting of the first memory area.

2. The computing device of claim 1, wherein the first predetermined value and the second predetermined value correspond to a factory default value associated with the respective storage device.

3. The computing device of claim 1, wherein the first memory location includes each of a plurality of counter variables associated with the configuration engine.

4. The computing device of claim 1, wherein the first memory location includes each of a plurality of jump to addresses in the configuration engine.

5. The computing device of claim 1, wherein setting the first memory area to the first predetermined value includes writing a same pattern to the first memory area to each of a plurality of addressable locations associated with the storage device.

6. The computing device of claim 5, wherein setting the second memory area to the second predetermined value includes writing a different pattern to the second memory location to each of a plurality of addressable locations associated with the second storage device.

7. The computing device of claim 6, wherein the programmable logic device is further to erase a third storage device in response to receiving the indication.

8. The computing device of claim 1, wherein the first storage device includes a boot block code and a remaining memory portion, wherein the boot block code is capable of restoring another code portion of the configuration engine stored in the first memory area.

9. The computing device of claim 8, wherein the configuration engine is to, as part of the recovery, re-initialize the first storage device to a factory condition after the first predetermined value is set using the boot block.

10. The computing device of claim 1, wherein the programmable logic device is one of a field programmable gate array (FPGA) and a complex programmable logic device (CPLD).

11. The computing device of claim 10, wherein the first storage device includes an Inter-Integrated Circuit bus (I2C bus) connected to the programmable logic device for setting the first memory area and the second storage device includes a serial peripheral interface bus (SPI bus) connected to the programmable logic device for setting the second memory area.

12. A method comprising:
receiving, at a programmable logic device, an indication to perform a recovery operation on a plurality of corruptible non-volatile storage devices including a first storage device associated with a baseboard management controller (BMC) and a second storage device associated with a low-level firmware;
in response to the indication, setting, by the programmable logic device a first memory area of the first storage device to a first predetermined value, wherein the first memory area includes a plurality of counter variables for the BMC and a portion of code for the BMC; and
setting, by the programmable logic device a second memory area of the second storage device to a second predetermined value.

13. The method of claim 12, wherein setting the first memory area includes writing a same pattern to the first memory area to each of a plurality of contiguous addressable locations associated with the BMC.

14. The method of claim 13, wherein the BMC includes a third memory area associated with a boot block, the method further comprising:
repairing, using the boot block, the portion of the code of the BMC by downloading firmware from a recovery location when the pattern is written to a particular address in the first memory area.

15. The method of claim 14, further comprising:
repairing, by the BMC, in response to the pattern written to the first memory area, a fourth memory area associated with a third storage device of the corruptible non-volatile storage devices, wherein the third storage device is associated with firmware executable on a central processing unit by causing the central processing unit to use a fourth storage device associated with backup firmware that was not wiped.

16. The method of claim 12, wherein the programmable logic device is one of a field programmable gate array (FPGA) and a complex programmable logic device (CPLD).

17. A server comprising:
a central processing unit;
memory;
a programmable logic device to receive an indication to perform a recovery operation,
wherein the programmable logic device includes a field programmable gate array (FPGA) or a complex programmable logic device (CPLD);
a plurality of non-volatile storage devices including a first storage device associated with a baseboard management controller (BMC) that includes a boot block and a non-boot memory block;
in response to receiving the indication, the programmable logic device to:
set the plurality of storage devices each to a recovery condition by wiping at least one memory area of each of the respective storage devices,
wherein, in response to the wiping, the BMC is to repair, using the boot block, a portion of code of the BMC by downloading firmware from a recovery location,
wherein the BMC is also to cause download and recovery of a second of the storage devices associated with an application-specific integrated circuit (ASIC) separate from the BMC.

18. The server of claim 17, wherein the at least one memory area of the second storage device includes all of the memory addressable by the programmable logic device to the second storage device.

19. The server of claim 17, wherein the at least one memory area of the second storage device includes all of the memory addressable by the programmable logic device of the second storage device and wherein the wiping includes writing a repeated pattern to the memory area.

20. The server of claim 17, wherein the at least one memory area of the second storage device includes each of a plurality of counter variables in the second storage device for use with the logic separate from the BMC.

* * * * *